United States Patent [19]

Smith et al.

[11] Patent Number: 5,790,790
[45] Date of Patent: Aug. 4, 1998

[54] ELECTRONIC DOCUMENT DELIVERY SYSTEM IN WHICH NOTIFICATION OF SAID ELECTRONIC DOCUMENT IS SENT TO A RECIPIENT THEREOF

[75] Inventors: Jeffrey C. Smith, Menlo Park; Jean-Christophe Bandini, Cupertino, both of Calif.

[73] Assignee: Tumbleweed Software Corporation, Redwood City, Calif.

[21] Appl. No.: 738,966

[22] Filed: Oct. 24, 1996

[51] Int. Cl.⁶ ................................... G06F 13/00
[52] U.S. Cl. ............... 395/200.36; 395/200.37; 395/300.49
[58] Field of Search .................. 395/670, 971, 395/672, 200.03, 200.48, 200.31, 200.38, 200.43, 200.49, 200.36, 200.34, 200.37, 200.33, 200.47

[56] References Cited

U.S. PATENT DOCUMENTS

| | | | |
|---|---|---|---|
| 4,532,588 | 7/1985 | Foster | 395/200.68 |
| 4,837,798 | 6/1989 | Cohen et al. | 379/88 |
| 5,008,814 | 4/1991 | Mathur | 395/200.51 |
| 5,293,250 | 3/1994 | Okumura et al. | 358/402 |
| 5,424,724 | 6/1995 | Williams et al. | 340/825.05 |
| 5,495,610 | 2/1996 | Shing et al. | 395/200.51 |
| 5,675,507 | 10/1997 | Bobo, II | 395/200.36 |
| 5,677,955 | 10/1997 | Doggett et al. | 380/24 |

*Primary Examiner*—Parshotam S. Lall
*Assistant Examiner*—Viet Vu
*Attorney, Agent, or Firm*—Michael A. Glenn; Donald M. Hendricks

[57] ABSTRACT

An electronic document delivery system and methods of its use are provided. A document, preferably in a portable format, is forwarded to a remote server (e.g. using HTTP to "push" the document to the server). The server sends a generic notification of the document to an intended recipient, and the recipient can download the document from the server using local protocols. In preferred embodiments, the invention is used for the controlled delivery of portable documents from a sender to a large number of recipients, using a network of servers that route the documents and notifications in a store and forward manner, while providing routing and accounting information back to the sender.

2 Claims, 10 Drawing Sheets

ELECTRONIC DOCUMENT DELIVERY SYSTEM IN WHICH NOTIFICATION OF SAID ELECTRONIC DOCUMENT IS SENT TO A RECIPIENT THEREOF

FIELD OF THE INVENTION

The invention relates to the field of computer networks. More particularly, the invention relates to techniques for the delivery of electronic documents to users over the Internet.

BACKGROUND OF THE INVENTION

The development of computerized information sources, such as those provided through the Internet or other on-line sources, has led to a proliferation of electronically available information. Currently, a user who subscribes to the Internet manually navigates through the Internet to visit sites which may or may not be of interest.

An inherent problem in this Internet system is that the available information is distributed through a "pull" type infrastructure, where the user who wants to receive information must manually search sites of interest, or use a finder application, to search and download appropriate information. For a user who wishes to publish and distribute information or documents, either an individual or a larger entity that has information that is desired to be distributed, the present "pull" system doesn't allow the freedom to send and distribute to a recipient or group of recipients, in a "push" fashion.

Facsimile technology is widely used at the present time for the distribution of simple documents, but has numerous drawbacks, including lower quality printed documents, costly and bulky paper copies (particularly if the recipient doesn't care to have a paper copy), loss of content (e.g. text and graphics can't be edited or manipulated), and time requirements for transmission, particularly for long or complex documents.

Electronic Mail (E-mail) provides a means for sending electronic messages from computer user to another. E-mail has advantages of convenience, format and storage of messages for later retrieval. As such, E-mail has been accepted and widely used for basic communication. E-mail is typically an ASCII based format, however, and proves to be very limiting for the communication of long or formatted documents. As well, E-mail is not the medium of choice for the distribution of complex documents, such as reports, articles, advertisements and art which can include page layout grids, postscript-formatted objects, multiple fonts with tracking and kerning, graphics, imbedded tables and spreadsheets, and other complicated information. Some E-mail systems provide a means for appending an ASCII based E-mail message with an associated file, to be downloaded along with the E-mail message. Most systems that allow the appending of an associated file are designed to allow a single user to send unsecured files to an associate or friend, and neither allow for controlled automated distribution to multiple recipients, nor do they provide advanced accounting, billing or other such features (e.g., receipt notification). E-mail gateways also limit the applicability of attachments, and do not solve the problems of security and receipt notation or acknowledgment.

C. Baudoin, Interenterprise Electronic Mail Hub, U.S. Pat. No. 5,406,557 (11 Apr. 1995) discloses an interenterprise communications center, which has a computer hub comprising a common core and a plurality of input and output modules. The input modules connect to a first end user, and convert a message sent by the first end user into a universal format. The hub core queues the message and forwards it to the output module for conversion into the format of the destination user. While the disclosed hub discloses techniques to relay simple e-mail messages, it is designed to convert the e-mail message formats, thus losing the integrity of the original text-based file.

The disclosed prior art systems and methodologies thus provide some methods for the delivery of documents, but fail to provide an economical, fast document delivery system that operates in a push-fashion, while conserving the integrity of the original electronic file . The development of such an electronic document delivery system would constitute a major technological advance. In addition, the ability to distribute electronic portable high content-quality documents to many recipients in a controlled, economical and accountable fashion would constitute a further technological advance.

SUMMARY OF THE INVENTION

An electronic document delivery system and methods of its use are provided. A document, preferably in a portable format, is forwarded to a remote server (e.g. using HTTP to "push" the document to the server). The server sends a generic notification of the document to an intended recipient, and the recipient can download the document from the server using local protocols. In preferred embodiments, the invention is used for the controlled delivery of portable documents, from a sender to a large number of recipients, using a network of servers that route the documents and notifications in a store and forward manner, while providing routing and accounting information back to the sender.

DETAILED DESCRIPTION OF PREFERRED EMBODIMENTS

The binary file delivery system 10 enables corporations, publishers and individuals to distribute documents electronically. Importantly, unlike existing Web based document publishing technologies, the binary file delivery system 10 allows the directed and secure distribution of documents. The Web could currently be characterized as a pull-publishing environment, where the consumer of documents must find and retrieve documents from a server. Push-publishing, by contrast, allows the producer of a document to direct the delivery of documents to consumers. Facsimile (fax), the postal service, and electronic mail (E-mail) are all examples of push-publishing.

Figure 1:
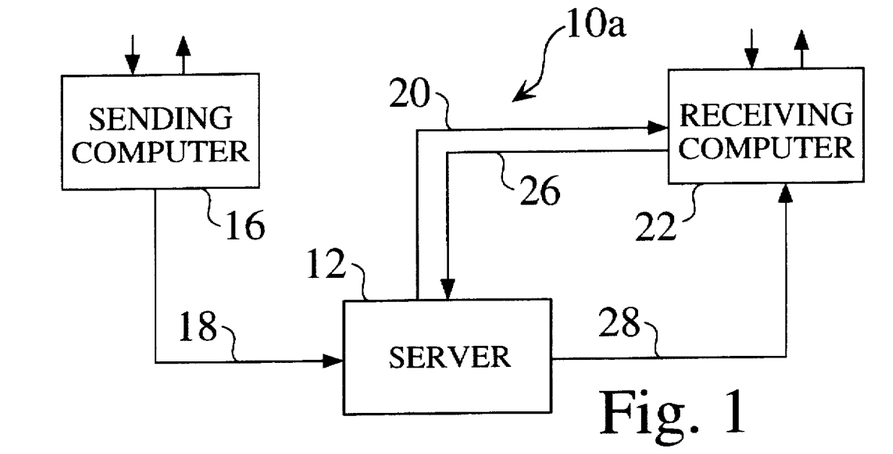
FIG. 1 is a block diagram which depicts a binary file delivery system using one binary file server.

FIG. 1 is a block diagram which depicts a binary file delivery system 10 using one binary file server 12. The binary file delivery system 10 allows users to push documents, enabling the producer of documents to direct where those documents will go. One way that the binary file delivery system 10 achieves push-publishing is by combining HTTP, which is usually implemented to pull information over a network, with SMTP (which only supports text). Additionally, the binary file delivery server 10 provides a host of services to facilitate the various applications of directed document delivery. At one level, the binary file delivery system 10 can be characterized as a new generation of facsimile technology, which utilizes networks instead of telephone lines, and moreover, introduces support for new document representations vastly superior to existing fax formats. At another level, the binary file delivery system 10 is a general purpose document delivery server capable of supporting massive amounts of documents and transactions. In all cases, the binary file delivery server 10 provides a complete and robust solution for document delivery.

Figure 2:
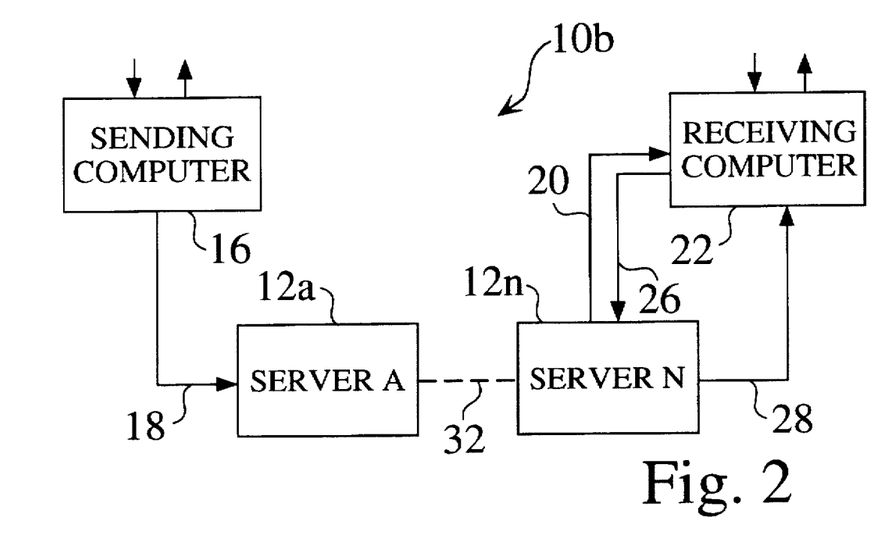
FIG. 2 is a block diagram which depicts a binary file delivery system using two binary file servers.
Figure 14:
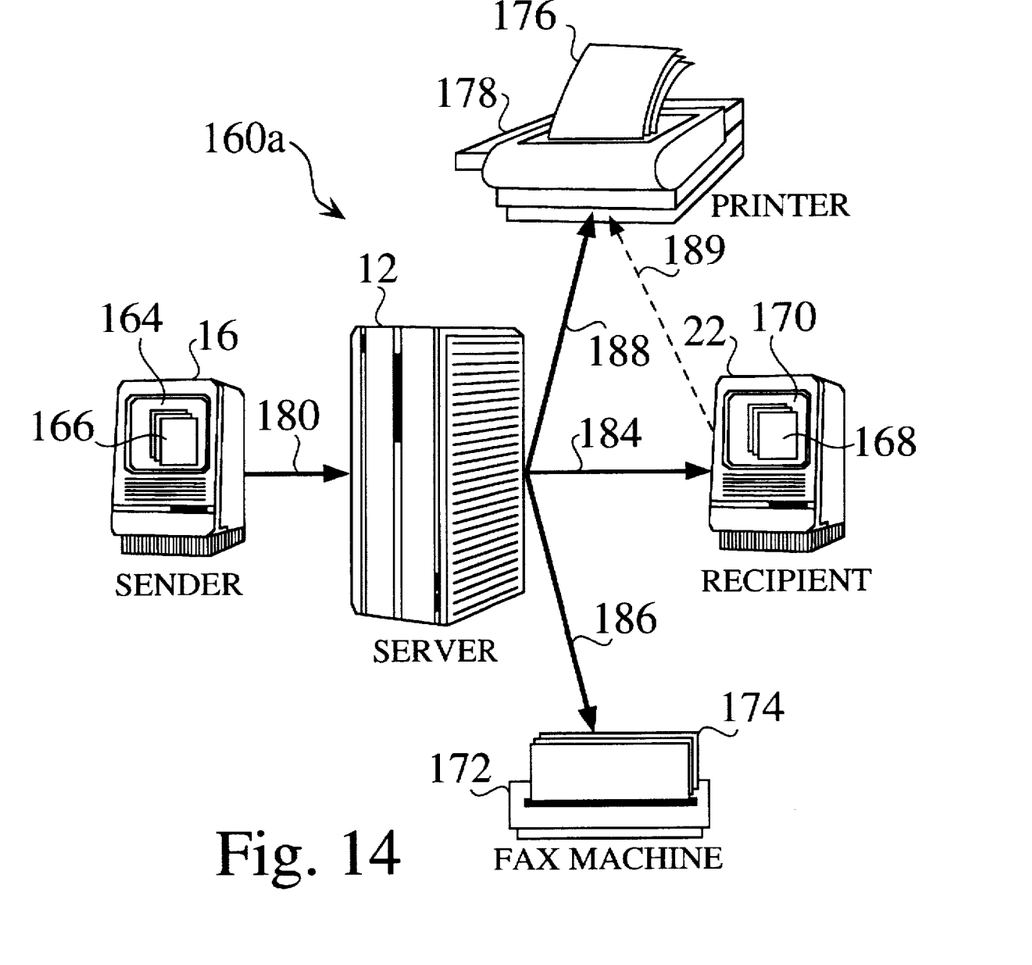
FIG. 14 provides a functional block diagram which depicts a portable document delivery system using one portable document delivery server.
Figure 15:
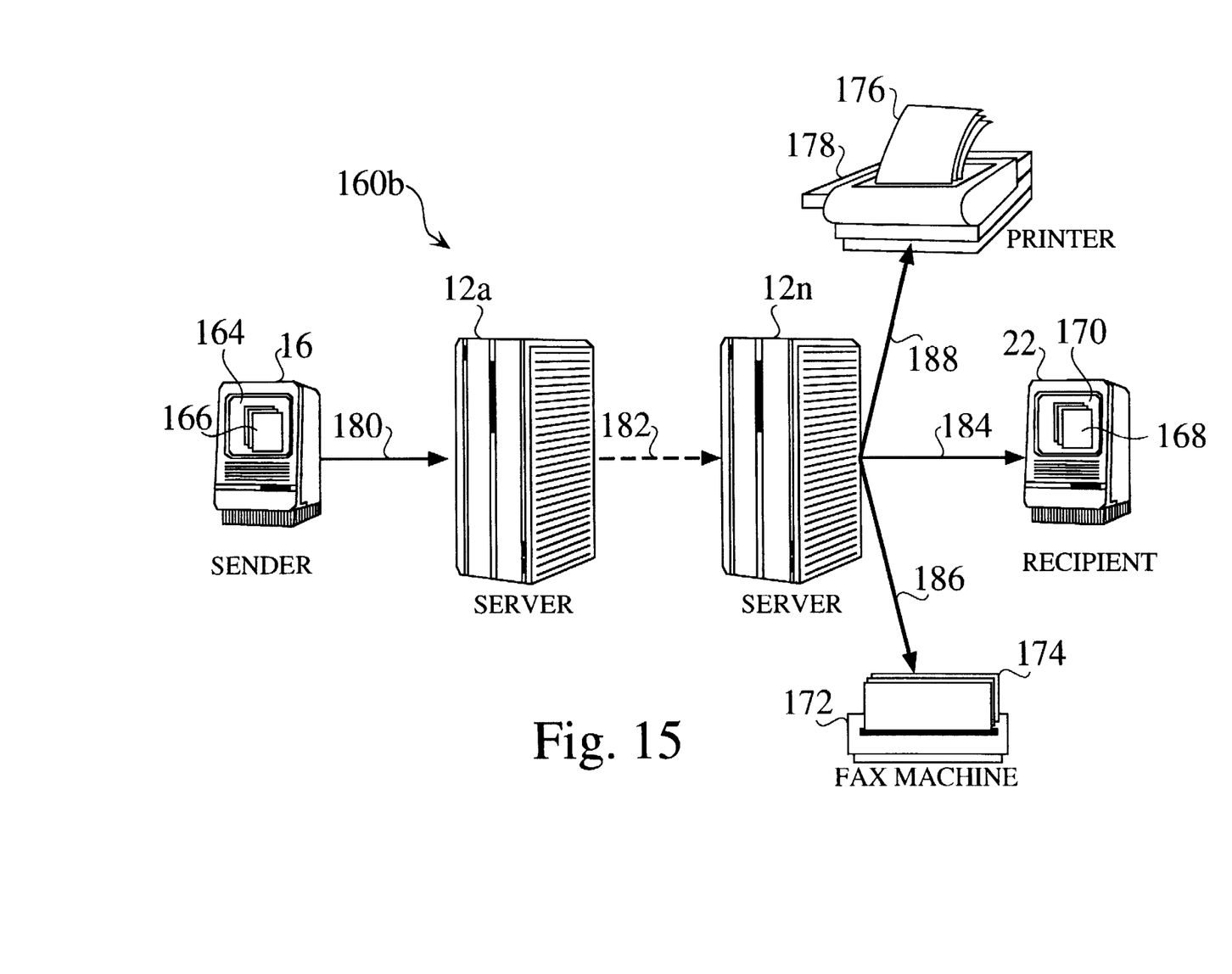
FIG. 15 provides a functional block diagram which depicts a portable document delivery system using two portable document delivery servers.

The binary file delivery server 10 is used for sending a set of binary files from one end-point to one or multiple end-points. An endpoint is typically a recipient 22 with Internet access, but can also be another entity, such as a facsimile machine 172 or a printer 178 (FIGS. 14, 15). The delivery of binary files is accomplished in a reliable, accountable, and tractable manner. The binary file delivery system 10 provides several levels of security for the directed files, from E-mail equivalent security, to better than facsimile or physical mail. The system also provides user account management including the credit and debit of billing accounts. The system can also cooperate between multiple binary file delivery servers 12, which may or may not be controlled by some other authority. FIG. 2 depicts a binary file delivery system using two binary file servers 12a and 12n, which communicate across an Internet.

The binary file delivery server 12 operates in three primary modes, which include a public mode, where senders 16 set up their accounts 132 themselves and are subject to billing, a private mode, where senders 16 are controlled by an administrator, and billing is more an internal accounting issue than a collection issue, and a publishing mode, where there are many recipients 22, but few senders 16.

Figure 4:
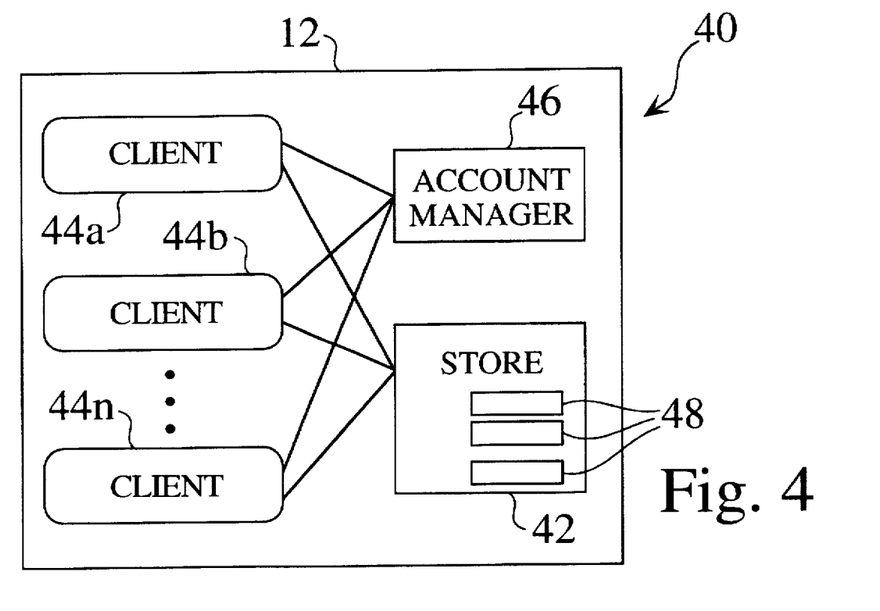
FIG. 4 is a schematic depiction of the binary file delivery server.

The binary file delivery server 12 is comprised of separate functional components, and are not necessarily processes or shared libraries. The binary file delivery server 12, shown schematically in FIG. 4, includes an intelligent storage compartment called a store 42, which is augmented by a set of clients 44a–44n, called store clients 44, which use the store methods and listen to the store events, but do not interact with or know about other clients 44. An account manager 46 component is a shared service that keeps information about the sender 16. The design also incorporates information about recipients 22 for the case of a receive application (as opposed to e-mail notification).

The client/server general architecture provides a better extensibility than a more pipelined structure. It also decouples the store clients 44 from each other, which can be useful in the context where some tasks are interactive, while others are more background oriented.

Figure 3:
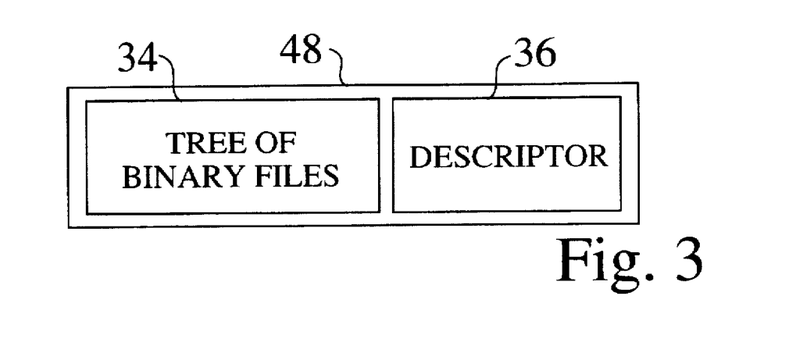
FIG. 3 is a block diagram which illustrates key elements of a store item.

The Store. The store 42 contains a set of store items 48. As shown in FIG. 3, a store item 48 includes a tree of binary files 34 and a descriptor 36, which is a set of store-defined and client-defined attributes. The tree of binary files 34 can be viewed as part of the store-defined attributes.

The file storage system provides the following functionality:

1) Permanent storage of Store items 48 (e.g. the binary file tree 34 contained in a store item 48 is written to disk)

2) Client read/write access to the descriptor 36, which is made up of store-defined and client-defined attributes (e.g. a client 44 can write the expiration date of a store item 48)

3) Client notification of store events 67 (e.g. clients 44 can be notified of the creation event 68 of a new store item 48)

4) Internal management according to store defined attributes (e.g. store item expiration date generates an event).

Figure 6:
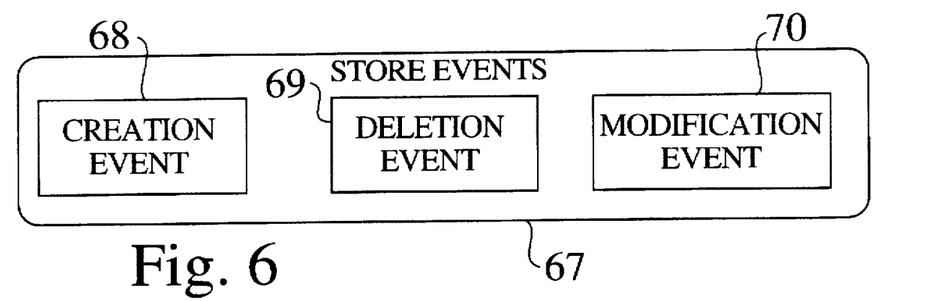
FIG. 6 illustrates different types of store events employed by the binary file delivery server.

The store 42 provides access to the store items 48 and generates store events 67, wherein store items 48 have store-defined attributes such as ID, creation date, file count, file names, file data, and store events 67 can be listened to by the clients 44. Store events 67 may include the creation 68, deletion 69 or modification 70 of a store item 48. The events 67 play a crucial role in the architecture, since this defines how the clients 44 synchronize their work with a very limited knowledge of the other.

Store Clients. Store clients 44 can be of a wide variety, and specific clients will be detailed further. In this framework, a store client 44 is some component which uses some of the store methods and or listens to some of the store events 67 to perform useful tasks on the store items 48.

Account Manager. The account manager 46 provides read/write access to user and billing accounts, and is used by clients 44 or other components of the system 10. The store 42 does not use or know about the accounts.

Other Components. Other components used by the store clients 44 and the store 42 itself are implemented within the architecture of the system. For example, inter-server communication, log management, and other administrative services, which is discussed below.

Figure 5:
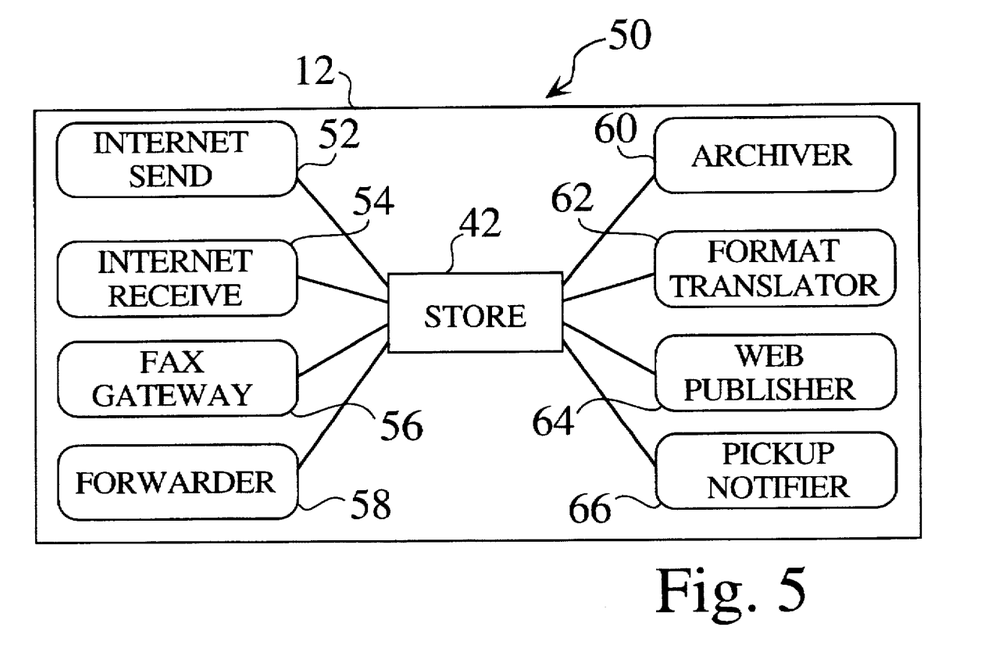
FIG. 5 provides an example of the architecture of one embodiment of the binary file server.

FIG. 5 provides an example of the architecture of one embodiment of the binary file server 42, including client 44 modules (52–66) that are used to implement server functions. The Internet Send 52 is used to create store items 48 and fills in the attributes. The Internet Receive 54 opens existing store items 48 and can be used to modify their attributes. A Fax gateway 56 listens to the creation events 68 generated by the store 42, processes relevant store items 48, and then deletes them from the store 42. A forwarder 58 listens to the creation events 68 generated by the store 42, and then examines the attributes of the new store items 48, and decides if forwarding is necessary. An archiver 60 listens to deletion events, and copies the store item 48 to secondary private storage before deletion occurs. The format translator 62 listens to creation, examines attributes, and if translation is needed, it reads, processes and writes back the files in the store item 48. The web publisher 64 listens to the creation events 68 and checks if the store item attributes specified a Web publishing, and if so, read the attributes as necessary. A pickup notifier 66 listens for a creation event 68, and then notifies recipients 22.

Security Issues for Internet-based Users. While the Binary File Delivery System 10 offers the flexibility to support specialized security solutions, it readily supports current industry-standard security solutions, including:

a) secure server interconnect and server authentication (available with SSL 2.0, which is built into the servers (HTTP);

b) secure Server-to-Server (on top of SSLX);

c) support end-points private key (the private key has to be exchanged by the users using their own channels.

d) support end-points public key, using CryptoAPI or the standard user public key. The system can also help the user generate a public key for BFD-use only, and update user account information with it, so that the sender does not have to communicate directly with the recipient to get the public key; and e) Client Authentication by the server with SSL and MS PCT (End user can get their own certificate and be authenticated by the servers).

An important aspect of the binary file delivery server 12 is that it handles multiple requests in parallel and minimizes the response time for most requests. Therefore, synchronization issues are important, for both correctness and system performance. Performance is enhanced by minimizing synchronized data access, deferring to asynchronous processing whenever possible, and by using multitasking and Inter-Process Communication (IPC) for the platform. One embodiment of the server 12 relies heavily on threading, which provides low overhead multitasking within one process, and leverages multiprocessor capabilities when available. The IPC on this embodiment uses named pipes, in addition to mail slots or Remote Procedure Call (RPC).

Figure 7:
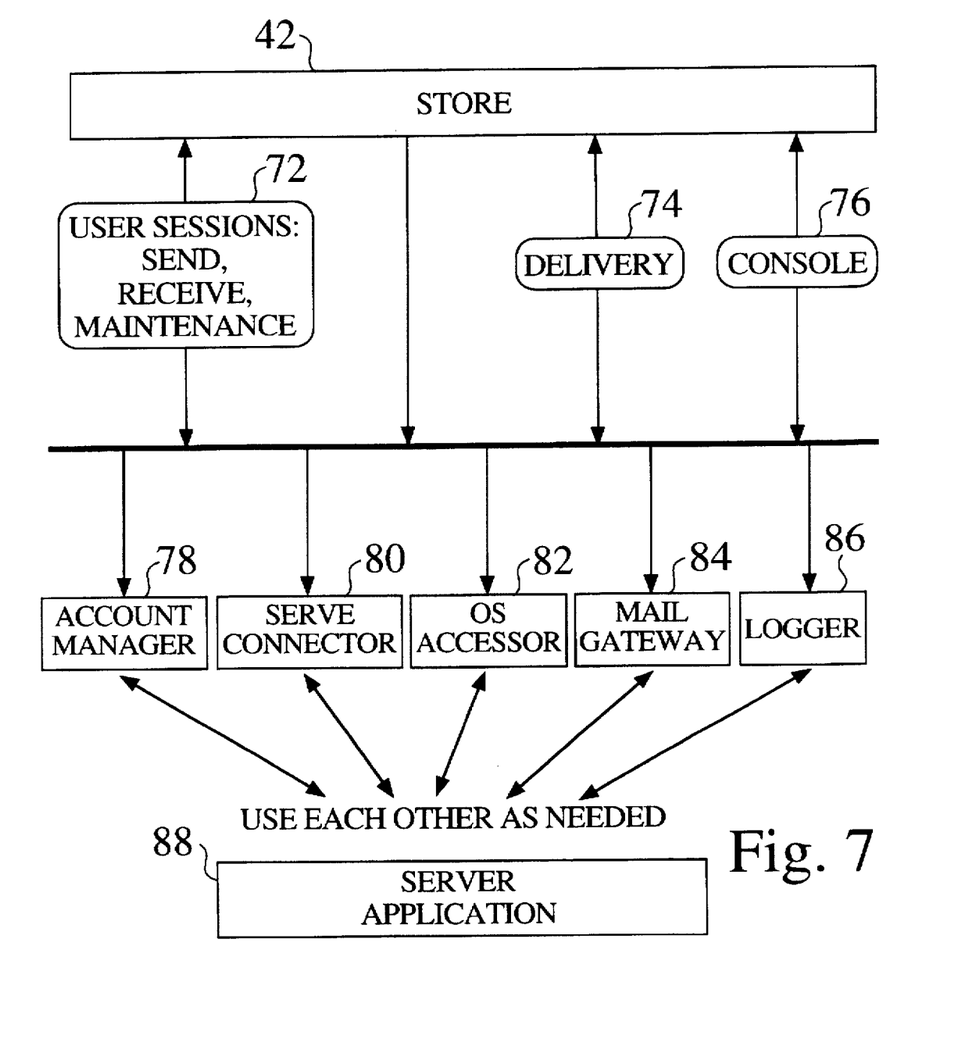
FIG. 7 is a block diagram of the specific components within the binary file delivery server architecture.

FIG. 7 provides a block diagram of the specific components within the binary file delivery server 12 architecture.

The user session 72 handles send sessions, receive sessions (which are implemented when the user is using a BFD desktop application 192, 198), HTML receive sessions (which are implemented through an HTML browser, as opposed to when the user is using the BFD desktop 164 (note that a BFD desktop session may go through HTML)), maintenance sessions (which implement the account setup and maintenance sessions (e.g. notification downloads, account setting modifications (not to be confused with console services by an administrator, as opposed to an end user of a public server), HTML maintenance sessions (which implement the account setup and maintenance through an HTML browser).

A delivery component 74 implements the background work of making a delivery, including notification and forwarding. A console 76 is used to implement administration sessions, which are conducted through an HTML interface instead of a specialized user interface. The console 76 provides a user interface to browse and modify all the server properties, including accounts, logging, performance, and parameter settings.

Shared Components. Shared components may be used by the store 42, by any of the store clients 44, or they may operate on their own. While they do not listen to store events 67, they can use store methods, as needed, for efficiency, such as for connector receive). Shared components may include:

1) An account manager which maintains all local account information and provides a unique access interface to local accounts, including billing account and remote account information;

2) a server connector 80, which handles all inter-server communications;

3) a mail gateway 84, which handles the sending and receiving of bounced mail;

4) a logger 86, which manages access read/write to the different logs which are classified by a type. The most important log is the send/receive transaction log, which tracks what happens to store items 48 over time; and 5) an operating system accessor 82, which provides a platform independent interface to the operating system for file input and output (I/O), process management (synchronization, locking, threads, process), IPC (RPC, shared memory, shared queues, pipes), network access (TCP/IP sockets, HTTP server interfacing, POP/SMTP interfacing). Specific portions will be implemented as needed.

The Server Application. The server application 88 is used to start up and shut down all pieces of the binary file delivery server 12, according to the configuration parameters. It also provides the administrative aspects of the server not covered by the Account Manager (46 or 78) or by the Logger 86, such as performance profiling, usage information and server parameters/configuration.

Figure 8:
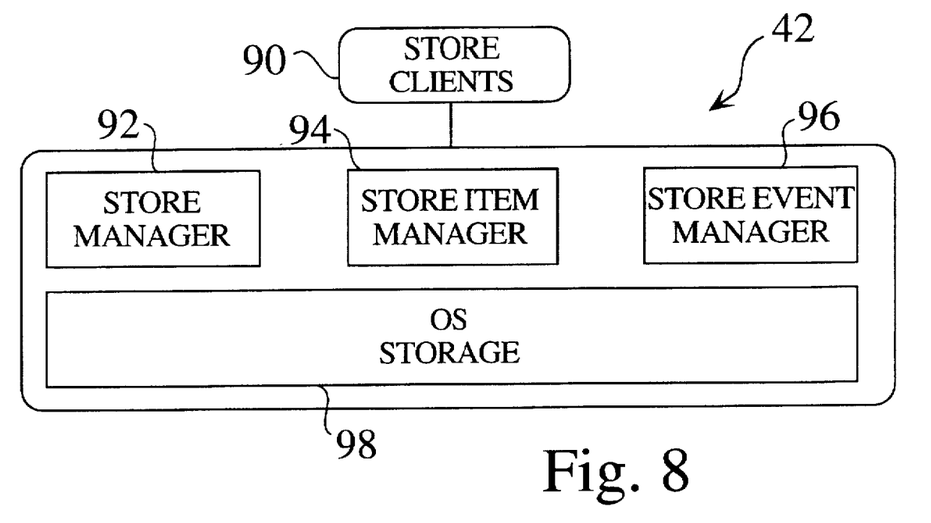
FIG. 8 provides a block diagram illustrating of the architecture of the store.

FIG. 8 provides a block diagram illustrating of the architecture of the store 42. A store manager 92 is used to maintain global state, to synchronize access to the store 42 and to provide housekeeping functions. A store item manager 94 is used to maintain the state, locks, and cache mechanism of a store item 48. A store event manager 96 is used to maintain listener lists and event filters, as well as to dispatch events according to event filters and event priorities.

Figure 9:
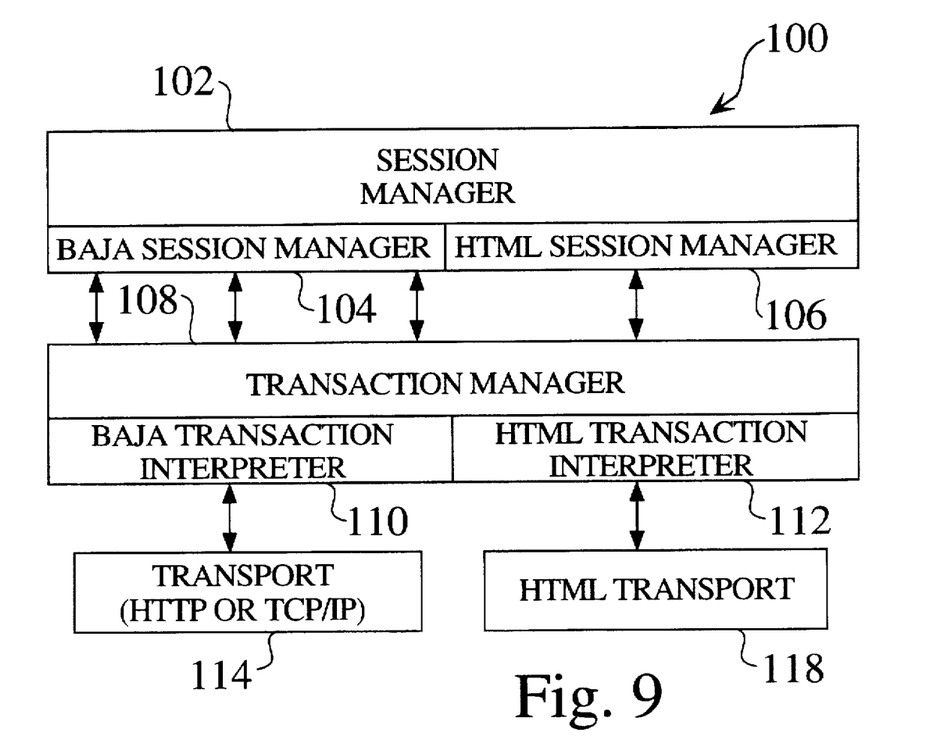
FIG. 9 illustrates how the user session organizes internet clients into three layers, including sessions, transactions, and transports.

FIG. 9 illustrates how the user session organizes internet clients into three layers, including sessions, transactions, and transports. The session manager 102 maintains all the currently active session states and performs the session-related housekeeping. It processes transactions coming from transaction managers 108 through the uses of the store 42 and the account manager 46. The transaction manager 108 receives raw data from the transport managers 114, 118, and performs validation and preprocessing using one or more BFD transaction interpreters 110 or HTML transaction interpreters 112. The transaction manager 108 then submits the data to the appropriate BFD session manager 104 or HTML session manager 106, waits for an answer, and then passes the answer back to the appropriate transport manager 1 14 or 1 18.

Figure 10:
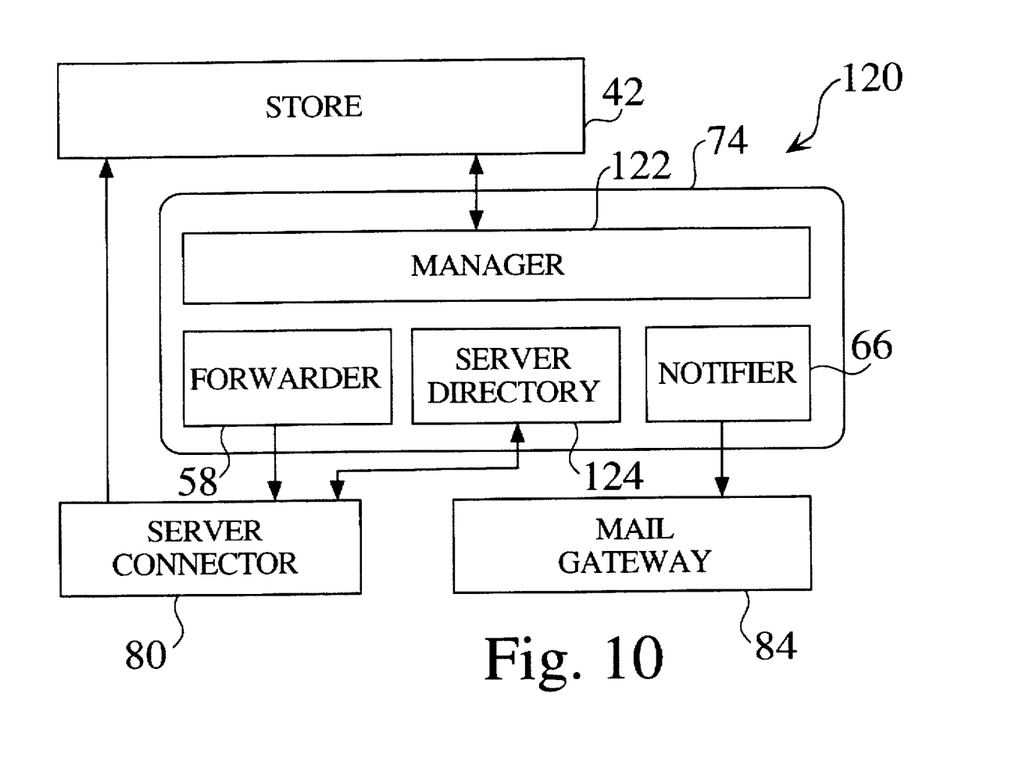
FIG. 10 illustrates the non-interactive tasks of a delivery, once the send session has created a store item or another server is forwarding a store item.

FIG. 10 illustrates the non-interactive tasks 120 of a delivery, once the send session has created a store item 48 or another server 12 a-n is forwarding a store item 48. The delivery manager 122 listens to relevant store events, makes a forwarding decision, and coordinates work with the notifier 66 and the forwarder 58. The server directory keeps track of the association between E-mail domains and server domains. The notifier 66 is used to handle E-mail notification 20 to the recipient 22. The forwarder 58 is used to forward store items 48 to other servers 12a–n, using a server connector 80. Since not all E-mail notifications may be received, an E-mail scanner is used to check the server mail account for "returned" E-mail, and then to match it with the failed transaction.

Figure 11:
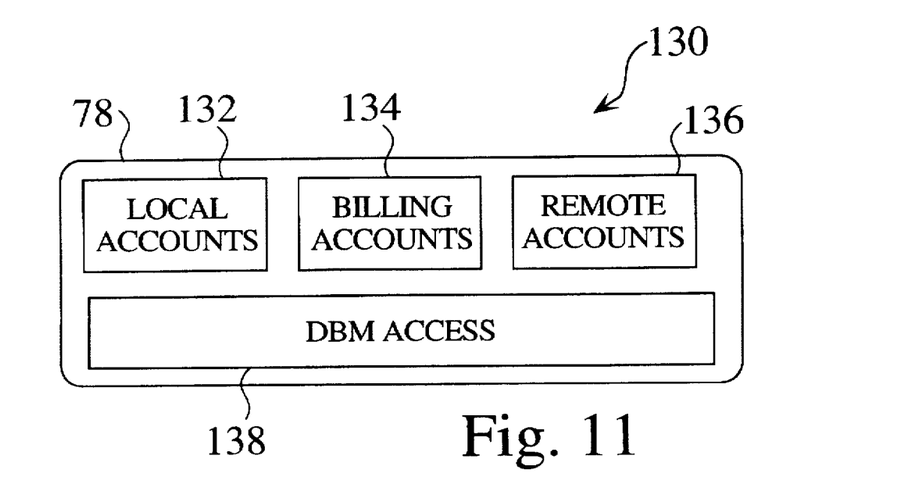
FIG. 11 provides details of the account manager architecture.

FIG. 11 provides details of the account manager architecture 130. The account manager 78 is used to maintain user account states 132 for the local server 12, to maintain billing account states 134 for the local accounts 132, to query local accounts 132, and to maintain a directory of remote accounts 136. The primary goal of the remote account directory 136 is to associate E-mail addresses with either BFD accounts or non-BFD accounts.

Figure 12:
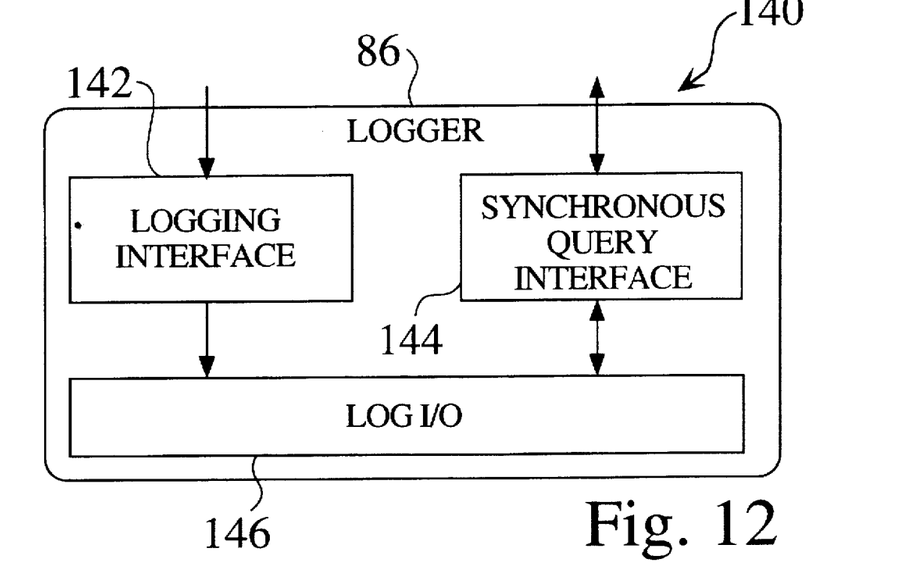
FIG. 12 provides details of the logger architecture.
Figure 13:
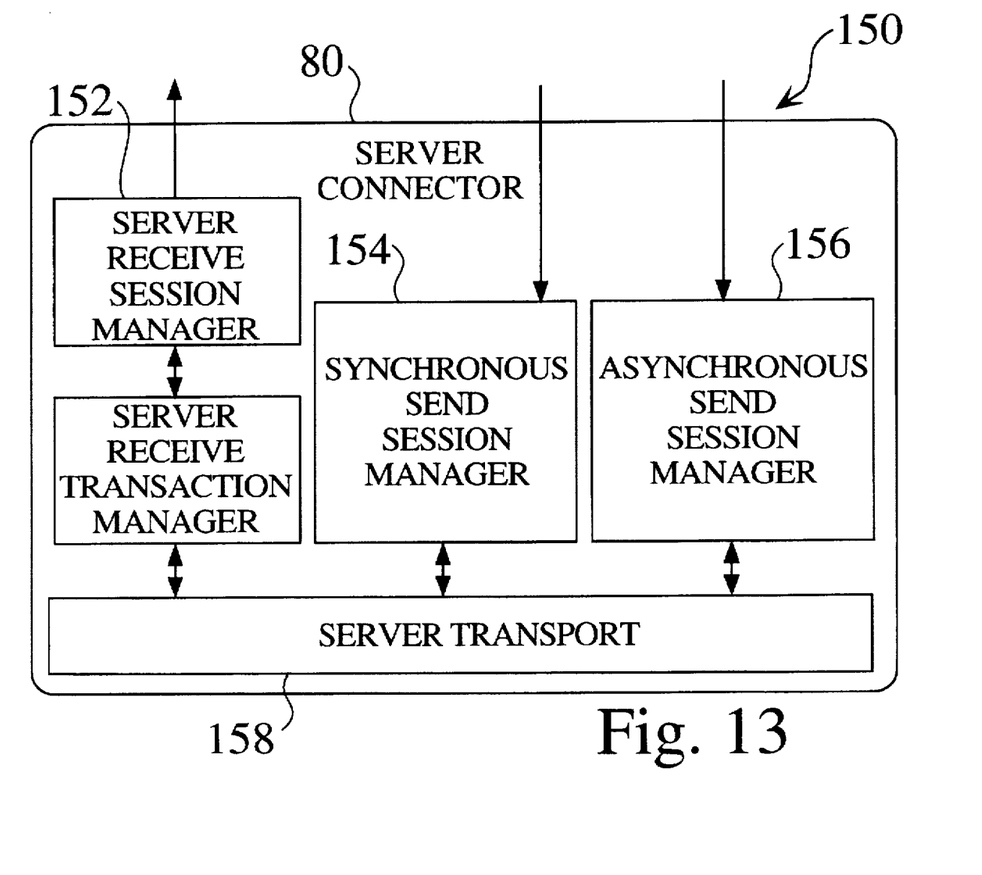
FIG. 13 provides details of the server connector architecture.

FIG. 12 provides details of the logger architecture. FIG. 13 provides details of the server connector architecture.

System Operation. The following example illustrates how the binary file delivery system 10 is used to distribute electronic information from a sender 16 to a receiver 22. A hypothetical publisher, Sam in Redwood City, Calif., wishes to send a document to an associate, Rob, in Tokyo, Japan. The following progression of events illustrates how this is achieved, in a controlled fashion.

Sam connects to a local server in Santa Clara, Calif. Sam's BFD desktop opens a connection to a local server 12a in Santa Clara, where his user account resides. The session manager 102 queries the account manager 78 to validate the user 16 (Sam). The session manager 102 then creates a send session state for the user 16.

Sam's Send Session. Sam's BFD desktop sends transaction details, such as the number of files, file size, and intended recipients. The session manager 102 attaches this data to the session state. Then the session manager 102 creates a store item 48 descriptor 36 in memory, and reserves disk space with the store 42, as well as a store item ID. Then the upload starts. The session manager 102 spools the data directly to a file with asynchronous I/O.

When the upload 18 of all of Sam's files is complete, the session manager 102 updates the store item descriptor 36 to the disk asynchronously, and then inserts the store item 48 asynchronously into the store 42.

The session manager 102 answer's Sam's upload with an acknowledgement, and provides information regarding the transaction. This session then ends.

At the Santa Clara Store. The insertion of the store item 48 is logged asynchronously in the logger 86 by the store 42. The store 42 then runs the store item descriptor 36 against the registered event handlers filters. For each match, it inserts the event and notifiee (Rob) in its event queue. Then that thread dies.

The event dispatch thread pulls the events, and dispatches them asynchronously to the notifiee at rate, depending on the tuning parameters of the system.

The Santa Clara Delivery is Notified. The delivery 74 is notified of a relevant event and starts a thread which waits on the lock of the store item 48 via a synchronous transaction with the store 42. Once the lock is secured, the thread reads the store item descriptor 36, and the delivery manager 74 analyzes it, to decide how to handle it. It turns out the recipient 22 is in the Japan domain, where another BFD server 12n is located. The delivery manager 74 found this out by querying a server directory 124. The manager then decides to forward the store item 48. The forward manager 80 asynchronously asks the Connector 80 to do a forward to Tokyo. Then the thread in the delivery dies. Note that the delivery does not know about the server protocols.

The Santa Clara Connector 80 is going to forward the Tokyo Connector 80. A thread handling the delivery request is eventually started in the Connector 80. It knows the host, and has a lock on the store item 48. It initiates the connection with the Tokyo server 12n. If it cannot connect, it goes to sleep for a while. Eventually, the connection opens, and the connector 80 enters the protocol interpreter, which eventually transfers the store item descriptor 36 and the associated binary data files 34. Then it closes the connection and logs a successful forward to the Tokyo server 12n in the logger 86. Then the connector 80 releases the lock on the store item 48 in the store 42 after having marked it as forwarded.

On release of the lock, the store 42 runs the store item descriptor 36 against the event filter list and finds an event filter that is handled locally. A successfully forwarded store item 48 causes a reference count decreased by 1. In this example, there is only one recipient 22, which means the count goes to zero. Therefore, the store 42 can move the store item 48 to a deletion list. A housekeeping thread of the store 42 will then purge the Store Item 48 at some point.

A thread in the Tokyo connector receiver 80 is begun, to handle the connection. Once the protocol interpreter understands it as a forward, it asks the store 42 for a store item ID 36 and the respective committed storage space. The actual store item descriptor 36 and files have been written to disk as it was receiving the data.

Once the connection is complete, the store item 48 is inserted asynchronously into the store 42 of the Tokyo binary file delivery server 12n.

Tokyo Delivery Component begins. The Tokyo store 42, on insertion, has generated an event which is going to be handled by a thread of the delivery. It has also logged the insertion of the new item in the logger 86. The manager 102? in delivery 74 realizes this has been forwarded, and that it will be received from this server 12n.

The server 12n queries the account manager 78 to see if there is an account associated with the E-mail address of Rob. If there is no associated account with Rob E-mail, then an E-mail is sent to Rob, with an URL which indicates the store item ID 36. It also queues an asynchronous request for the connector 80 to notify the Santa Clara server 12a that Rob has been notified. If Rob has an account here, then the delivery puts an asynchronous update request with the account manager 78 to mention the pending delivery; in this case the scenario is continued.

Rob connects to the Tokyo Server to check on new documents. When Rob opens its receive session, the session manager 102 synchronously checks the Rob account for validity, and in the process it updates the session state, to remember that the account is flagged with a pending receive. The BFD desktop of Rob eventually asks for the document to be received. The session state has the answer and says yes.

The Rob desktop 170 asks for the receive, and the session manager 102 synchronously asks the store 42 for the lock on the relevant store item 48.

Once granted, it can answer by sending the first portion of data. Once the document is downloaded, it asynchronously logs a successful receive with the logger 86. Then it puts an asynchronous request with the connector 80 to notify the Santa Clara server 12a of the final delivery.

At the receive session in Tokyo, the session manager 102 releases the lock, and puts an asynchronous delete request to the store 42. The Rob receive session then terminates. The connector 80 in Santa Clara runs the protocol interpreter, which says that the notifications must be queued to the logger 86.

Sam checks on Status. Sam connects to do a receive session followed by a maintenance session. The maintenance session 72 receives a request to check on the status of the sent document. The maintenance session 72 synchronously submits a query to the logger 86 using the store item ID 36 that was passed down to the Sam desktop at send time. The query returns the lists of matching records, which are processed and passed back to the desktop, which can then update the user interface 16.

Portable Document Delivery System. Electronic portable documents are becoming increasingly popular. These files can be distributed to different platforms without losing their original look and feel. Adobe Systems' Acrobat PDF™ and Novell's Envoy™ portable document formats have come into widespread use. In a preferred embodiment of the invention, a portable document delivery system 160 achieves a universal solution to the delivery of electronic documents, by applying portable document technology to the Internet. The portable document delivery system 160 provides complete compatibility with portable electronic document formats, including Novell's ENVOY™ and Adobe System's PDF™ formats.

Recipients 22 of portable documents from the portable document delivery system 160 can view, search, print, archive, or export information from their documents. Documents distributed using Envoy™ or Acrobat™ in conjunction with the portable document delivery system 160, preserve complete visual fidelity and may be produced on high resolution output devices with the highest level of quality and resolution. Portable document formats allow preserve content and color of the information within a document, and many formats allow indexing, searching, and hypertext linking, while allowing the file to be stored in a compact manner.

FIG. 14 is a functional block diagram which depicts a portable document delivery system 160a using a binary file delivery server 12. FIG. 15 provides a functional block diagram depicting a portable document delivery system 160b using two binary file delivery servers 12a and 12n communicating over the Internet.

To address the limitations of the Web and electronic mail, in addition to providing additional services, the portable document delivery system 160 includes server software which runs on top of existing electronic mail, http server software, and database systems. Thus, the portable document delivery system 160 combines industry standard solutions for the electronic mail, Web, and database to enable corporations and users to direct the delivery of documents to recipients.

The following disclosure elaborates on the requirements for a universal document delivery solution, as well as the specific components of the portable document delivery system 160.

The portable document delivery system 160 combines three basic components to provide a solution to universal document delivery.

1) Portable Document Send Client. A portable document send client (PDSC) 192 integrates all desktop applications 190 directly with the portable document delivery system 160. The PDSC 192 is not required for all embodiments of the invention. Publishers who simply wish to leverage the BFD server 12 directly are free to do so. The PDSC 192 is intended for the standard corporate computer user who requires a point-to-point to the delivery problem.

2) Binary File Server. The binary file delivery server 12 works on top of Internet standards to deliver documents to recipients. The BFD server 12 can be invoked transparently through the portable document send client (PDSC) 192, or can be invoked and customized directly using a server configuration user interface 198.

3) Portable Document Receive Client. The portable document receive client (PDRC) 194 is the software component which recipients 22 of documents utilize to receive, view, and print documents. Recipients 22 who do not have the PDRC software 194 will be given links to access the software directly over the Internet. In most cases, the PDRC 194 will behave simply as a Netscape NAVIGATOR™ Plug-in or a Microsoft ActiveX™ control or a Java Applet, thus directly integrating the PDRC 194 with the recipient's existing browsers.

Figure 16:
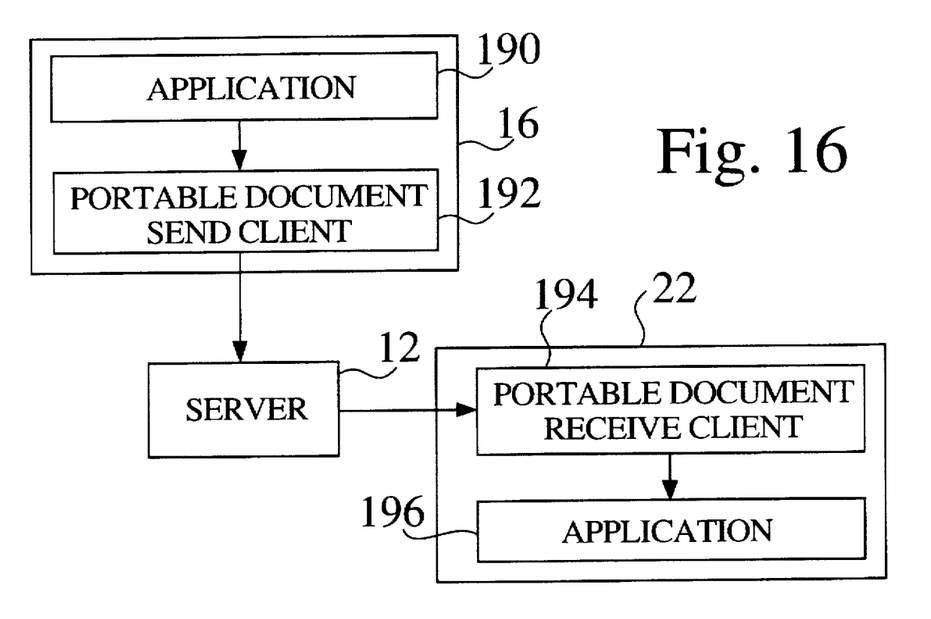
FIG. 16 illustrates how a portable document send client application and a portable document receive client application are used in the invention.
Figure 17:
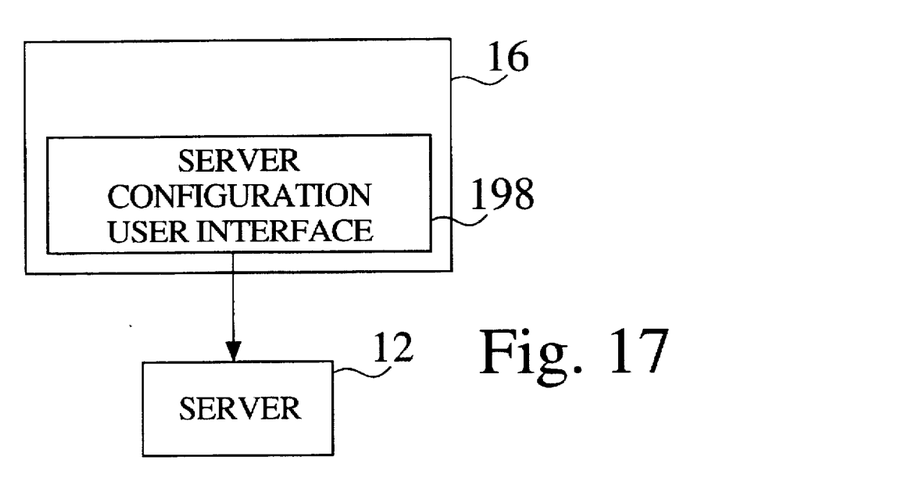
FIG. 17 illustrates how a server configuration user interface application is used in the invention.

FIG. 16 illustrates how a portable document send client application and a portable document receive client application are used in the invention. FIG. 17 illustrates how a server configuration user interface application is used in the invention.

Portable Document Delivery System Requirements. At the most basic level, a document delivery solution must enable documents to be directed to customers by the producers of those documents, or "pushed". The portable document delivery system 160 is designed so that different types of recipients operating on different computer systems, with different operating systems, E-mail systems, and document types can all benefit from receiving, reading, and using electronic portable documents. The various design parameter categories that the portable document delivery system 160 is adapted for includes primary computer systems (e.g. PCs, Workstations, Servers), primary operating systems (e.g. Macintosh, Win 3.1, Win '95, NT, Unix, OS/2), electronic mail systems (e.g. Microsoft, cc:Mail, Groupwise, Notes, Eudora), document types (e.g. paper, Postscript, Quark, WordPerfect, Excel), and user types (e.g. MIS, Legal, Financial, Consumers/Home, MarketingCommunication (MarCom)).

A unique aspect of the portable document delivery system 160 is the level of compatibility the solution provides with all computer systems, operating systems, electronic mail systems, and document types. In one embodiment of the invention, the sender 16 and the receiver 22 of a document are both connected to the Internet. In a preferred embodiment of the invention, the portable document delivery system 160 provides not only an Internet delivery solution, but also backward compatibility with facsimile machines 172 and printers 178, as well as forward compatibility with future distribution print architectures.

Universal Delivery. Delivery solutions must enable users to distribute documents to anyone, which requires support for a variety of computing platforms, compatibility with facsimile 172, and compatibility with future distributed printing architectures. The portable document delivery system 160 can support the conversion and delivery of complex postscript files. Documents can be delivered to any recipient 22 who has an E-mail account and access to the Internet, regardless of the recipient's platform or E-mail system.

Security. Typical applications of document delivery require complete security from the origin of the document complete to the destination. This requirement becomes more pervasive as documents begin to travel across open and wide area networks. The portable document delivery system 160 employs several levels of security. The Portable Document Send Client 192 authenticates and creates a secure socket to upload information to the server 12. Thus, non-BFD servers cannot intercept documents. Additionally, The PDSC 192 allows the sender 16 to use private and or public encryption to guarantee that only the intended recipients of a document can access those documents. Even in cases where encryption is not used, the portable document delivery system 160 includes sophisticated algorithms to prevent unauthorized users from accessing documents.

Account Management Services. In many instances, document delivery applications cater to businesses where each sender 16 or recipient 22 of a document must be maintained. Consider the case of periodically delivering the documents to the same group of a hundred thousand recipients 22. The sender 16 of the document requires tools to update and manipulate the database of the large subscription/ distribution base.

The portable document delivery system 160 enables publishers 16 to create accounts on BFD servers 12 and then associate transactions with specific accounts 132, 134, 136. The system also enables publishers to consolidate several user accounts into a single billing account 134. Additionally, it allows publishers to associate a specific billing code with transactions which may be consolidated in transaction reports. For example, a law firm could create an account and then a billing code for each client, associating a billing code and account with each document's transaction. The portable document delivery system 160 maintains and updates the account information automatically. A portable document delivery system 160 reporting engine then allows the user to create a report for a given account or for a specific billing code. Such a scheme facilitates client management as well as billing.

Transaction Management Services. Related to account management is the requirement of transaction management. Not only is it necessary to maintain the database of senders 16 and recipients 22 of documents, it is also necessary to provide services to manage the transaction of sending documents. For example, a sender 16 may want to know if the document was actually delivered and actually received, and perhaps who received the document. In many instances, the publisher 16 would like to charge postage for delivery and will therefore require services to maintain and update accounting information associated with the delivery transactions.

The portable document delivery system 160 is able to create logs associated with each send transaction, and maintain these logs. Each transaction, or document send operation is associated with a specific account. Users 16 can query transaction information directly from the server.

Reporting. Account and transaction management provides no value unless sophisticated means of reporting are provided. For example, users 16 can be provided with a full report of a given transaction, including such information as which documents were delivered to whom, how many users have confirmed delivery of the document, or for billing purposes, the costs associated with the transaction.

Scalability and Bandwidth. Because of the large scope and application of document delivery applications, the portable document delivery system 160 is capable of expanding its capabilities to service millions of documents or recipients 22. Several aspects of the delivery process occur in real time, while other aspects may be deferred or scheduled. In many cases, the portable document delivery system 160 dynamically extends the amount of bandwidth or sets of servers 12a–n deployed to achieve the necessary throughput for document delivery.

The portable document delivery system 160 is scalable to conform with user requirements. The server software is designed to support the sending of millions of documents per day, and is able to exploit whatever bandwidth has been dedicated to a given server. For example, one current BFD server 12 effectively utilizes 10 Megbit/second bandwidth. The various processes running on BFD servers 12 operate asynchronously, thus allowing for optimal performance on multi-processing servers 12, as well as sophisticated scheduling of the servicing of a given transaction. Special care is taken to operate in real time, particularly for the access of documents from the server 12 by recipients 22.

BFD servers 12 can also distribute work loads across other servers 12a–n. A preferred embodiment of the invention allows individual processes running on a single server 12 to be distributed across a collection of servers 12a–n. In this embodiment, account management processes could run on one server (e.g. 12d), while the logging, reporting, transaction management, send, propagate, and retrieve processes run on another server (e.g. 12h).

Portable Document Send Client Specification. The Portable Document Send Client (PDSC) 192 allows any computer user to distribute documents directly from the desktop of any personal computer, such as a PC or Macintosh computer. The PDSC 192 integrates directly with all applications 190 through the uses of virtual printer devices, thus enabling the PDSC 192 to be compatible with all applications 192 and formats. Importantly, because the PDSC 192 is integrated directly with portable document technology, the sender 16 of a document need not make assumptions about the capabilities of the intended recipient 22 of the document.

The PDSC 192 allows two primary modes of usage: print or "drag and drop". By print, a sender 16 can simply select the print option from any application 190 and trigger the sequence of events to generate a portable document, and then address and send that document. From the user's perspective, they simply select the print command and are then prompted for the destination of the document using standard addressing interfaces and address books. A Microsoft Mail™ user, for example, would be prompted with the standard Microsoft Mail™ addressing dialogs to direct where a document may be sent. After selecting the destination of the document, the PDSC 192 automatically connects to a BFD server 12 and securely uploads the documents 166 and the intended list of recipients 22, as well as any other attributes selected to customize the send. "Drag and Drop" usage allows users 16 to avoid launching applications and printing to send documents; the document may simply be dropped on a PDSC 192 send icon, which is accessible from the sender's desktop 164.

Additional functionality and customization is one click away. During the addressing process, users 16 are free to customize the options of their send by invoking advanced options. By default, each send will reuse the existing parameters for sending documents. Users 16 can also use the advanced options user interface 193 to customize their delivery options, including, for example, security options and receipt requirements. For example, if the user 16 desires to customize the security options, including private and or public key encryption, the user simply checks a "Public Encrypt" or "Private Encrypt" option. Similarly, the user can select the "Notify on Receipt" option, thus informing the BFD server 12 to confirm delivery when the document is actually received.

BFD Server Configuration Options and User Interface. The BFD Server 12 can be configured and customized directly from a sender desktop 164. The access to the BFD server 12 from the desktop is achieved using an HTML forms user interface. This user interface exists to give server administrators access and control over the advanced options of the BFD server 12. For example, a server administrator might update the database of the 100,000 recipients who are intended to receive a specific document, and then directly invoke the send of the document to those recipients. The server administrator might generate a report regarding the send transactions which occurred during the previous week.

To access the BFD server 12 from the desktop 166, a user 16 must have a special account created on the BFD server 12, which is created ahead of time by the BFD server 12. Additionally, accessing the BFD server 12 over this account requires several layers of authentication and security, thus preventing unsolicited access.

The Server Configuration User Interface 198 allows the user 16 to access and control the server settings, which may include transaction management, account management, reporting facilities, direct upload and download of documents to distribute, direct manipulation of recipient lists, and direct access to send options.

Portable Document Receive Client. The recipient 22 of a document can utilize the portable document receive client (PDRC) 194 to access and manipulate documents which were sent to the recipient 22 by the portable document send Client 192 or by the BFD server 12 directly via the BFD server administrator. In the event that the recipient 22 of a document does not already have a PDRC 194, the software may be downloaded and installed directly from the Internet. The architecture of the portable document delivery system 160 simplifies this process, and employs dedicated software and scripts, in addition to advents in new browser architectures to enable first-time recipients 22 to be one click away from accessing the necessary software to receive documents.

The most basic case of the portable document receive client 194 can simply function as browser extension, such as a Netscape NAVIGATOR™ plug-in or a Microsoft ActiveX™ control. For other users, the PDRC 194 will behave as a stand alone application which works as a helper application.

A third application exists for portable document delivery system 160 customers who prefer direct access to the portable documents from the recipients desktop 170. In this configuration, a dedicated portable document receive client 194 can be downloaded directly from the Internet. This component will continually monitor the activity of the portable document delivery system 160, and will automatically extract any incoming portable documents from BFD servers 12, and open them for immediate document communication on the computer desktop 170 of the recipient 22.

Recipients 22 of portable documents from the portable document delivery system 160, depending on the send configuration options, will be allowed to view, search, print, archive, or export information from their documents. Documents distributed using Envoy™ or Acrobat™ in conjunction with the portable document delivery system 160 will preserve complete visual fidelity and may be produced on high resolution output devices with the highest level of quality.

Figure 18:
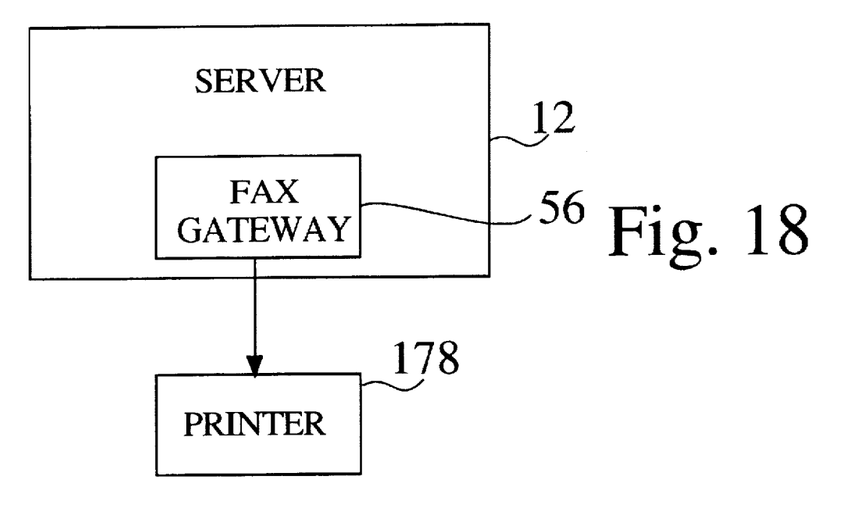
FIG. 18 illustrates how a document can be sent by the fax gateway of a server to a printer.
Figure 19:
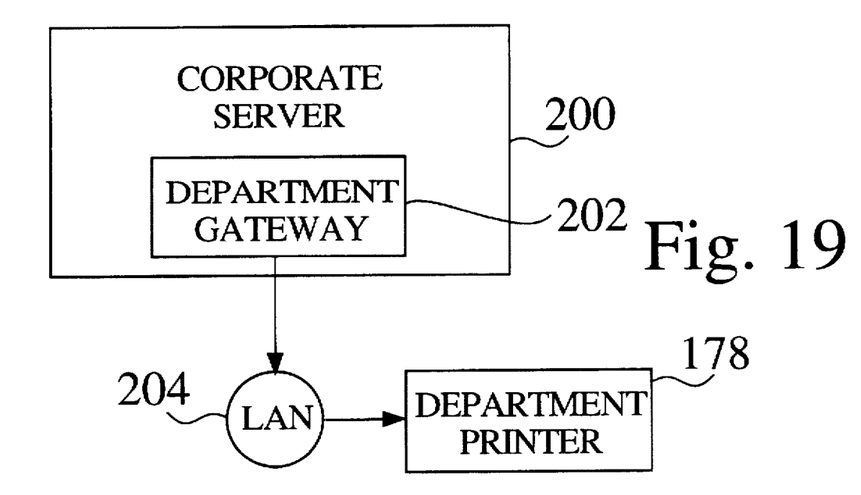
FIG. 19 illustrates how a document can be sent by the department gateway of a dedicated corporate server through a LAN to a department printer.

FIG. 18 illustrates how a document can be sent by the fax gateway 56 of a BFD server 12 to a printer 178. FIG. 19 illustrates how a document can be sent by the department gateway 202 of a dedicated corporate BFD server 200 through a LAN 204 to a department printer 178.

CONCLUSION

Although the electronic document delivery system and its methods of use are described herein in connection with use in the Internet, the invention may be applied to any of a wide variety of networks, including internets, intranets, LANs and WANs, or any combination thereof, as desired. As well, the invention may be applied to a wide variety of computer platforms, communication protocols, portable document formats, or any combination thereof, as desired.

Although the present invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An apparatus for delivering an electronic document, comprising:

a sending computer for sending an electronic document;

a receiving computer for receiving said electronic document; and a server interposed between said sending computer and said receiving computer, wherein when said electronic document is forwarded to said server from said sending computer without regard to said receiving computer's capabilities, said server sends a notification of said forwarded electronic document to said receiving computer, wherein said receiving computer downloads said forwarded electronic document from said server using said receiving computer's local protocols; and wherein said server automatically records an acknowledgment, and makes said acknowledgment available to said sending computer either when said server sends said notification of said forwarded electronic document to said receiving computer, or when said receiving computer downloads said forwarded electronic document from said server, wherein said notification includes a direct reference to said forwarded electronic document at said server, and wherein said receiving computer uses said direct reference to locate and download said forwarded electronic document from said server.

2. An apparatus for delivering an electronic document, comprising:

a sending computer for sending an electronic document;

a receiving computer for receiving said electronic document; and a server interposed between said sending computer and said receiving computer, wherein when said electronic document is forwarded to said server from said sending computer without regard to said receiving computer's capabilities, said server sends a notification of said forwarded electronic document to said receiving computer, said notification including a direct reference to said forwarded, electronic document at said server, wherein said receiving computer uses said direct reference to locate and download said forwarded electronic document from said server using said receiving computer's local protocols; and wherein said server automatically records an acknowledgment, and makes said acknowledgment available to said sending computer either when said server sends said notification of said forwarded electronic document to said receiving computer, or when said receiving computer downloads said forwarded electronic document from said server.

* * * * *